(12) United States Patent
Bulu et al.

(10) Patent No.: US 11,262,501 B2
(45) Date of Patent: Mar. 1, 2022

(54) OPTICAL FIBER CONNECTION

(71) Applicant: SCHLUMBERGER TECHNOLOGY CORPORATION, Sugar Land, TX (US)

(72) Inventors: Irfan Bulu, Somerville, MA (US); Francois M. Auzerais, Boston, MA (US); Robert Graham, Abu Dhabi (AE); Mohamed Aly Sadek, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/532,870

(22) PCT Filed: Dec. 2, 2015

(86) PCT No.: PCT/US2015/063445
§ 371 (c)(1),
(2) Date: Jun. 2, 2017

(87) PCT Pub. No.: WO2016/090003
PCT Pub. Date: Jun. 9, 2016

(65) Prior Publication Data
US 2017/0357051 A1    Dec. 14, 2017

Related U.S. Application Data

(60) Provisional application No. 62/086,539, filed on Dec. 2, 2014.

(51) Int. Cl.
*G02B 6/26* (2006.01)
*G02B 6/42* (2006.01)
(Continued)

(52) U.S. Cl.
CPC .............. *G02B 6/14* (2013.01); *E21B 17/028* (2013.01); *E21B 34/06* (2013.01); *E21B 47/017* (2020.05);
(Continued)

(58) Field of Classification Search
CPC .......... G02B 6/3897; G02B 6/34; G02B 6/14; G02B 6/32; G02B 6/3845; G02B 6/3866; E21B 17/028; E21B 47/011
(Continued)

(56) References Cited

U.S. PATENT DOCUMENTS 5,732,170 A  *  3/1998  Okude .................... G02B 6/021
                                                        385/123
6,374,009 B1 *  4/2002  Chang ................... G02B 6/2552
                                                        385/16
(Continued)

OTHER PUBLICATIONS

International Search Report and Written Opinion for corresponding PCT Application Serial No. PCT/US2015/063445, dated Mar. 28, 2016, 13 pages.
(Continued)

*Primary Examiner* — Kaveh C Kianni
*Assistant Examiner* — Hung Q Lam

(57) ABSTRACT

Optical fiber connections and their applications in downhole assemblies are described herein. The downhole assembly includes a well completion element with an end that couples with a corresponding well completion element. An optical fiber extends along at least a portion of the well completion element and transmits an optical signal using a first mode. The well completion element includes an optical fiber connector that is coupled to the optical fiber. The connector also includes a mode converter that receives the optical signal from the optical fiber and converts the optical signal from the first mode to a second larger mode. This second larger
(Continued)

mode may be more robustly communicated to a corresponding optical fiber connector affixed to the corresponding well completion element.

23 Claims, 7 Drawing Sheets

(51) Int. Cl.

| | |
|---|---|
| *G02B 6/34* | (2006.01) |
| *G02B 6/36* | (2006.01) |
| *G02B 6/00* | (2006.01) |
| *G02B 6/14* | (2006.01) |
| *G02B 6/38* | (2006.01) |
| *E21B 47/017* | (2012.01) |
| *E21B 47/135* | (2012.01) |
| *E21B 17/02* | (2006.01) |
| *E21B 34/06* | (2006.01) |
| *G02B 6/32* | (2006.01) |
| *G02B 6/02* | (2006.01) |
| *E21B 47/07* | (2012.01) |
| *E21B 47/007* | (2012.01) |
| *E21B 47/113* | (2012.01) |
| *E21B 47/06* | (2012.01) |
| *E21B 49/00* | (2006.01) |
| *E21B 49/08* | (2006.01) |

(52) U.S. Cl.
CPC .............. *E21B 47/135* (2020.05); *G02B 6/32* (2013.01); *G02B 6/34* (2013.01); *G02B 6/3816* (2013.01); *G02B 6/3845* (2013.01); *G02B 6/3849* (2013.01); *G02B 6/3866* (2013.01); *E21B 47/007* (2020.05); *E21B 47/06* (2013.01); *E21B 47/07* (2020.05); *E21B 47/113* (2020.05); *E21B 49/00* (2013.01); *E21B 49/08* (2013.01); *E21B 2200/04* (2020.05); *G02B 6/02076* (2013.01)

(58) Field of Classification Search
USPC .. 385/25, 28, 31, 37–39, 53, 55, 75, 88, 92, 385/135
See application file for complete search history.

(56) References Cited

U.S. PATENT DOCUMENTS

| | | | |
|---|---|---|---|
| 7,956,317 B2 | 6/2011 | Artyushenko | |
| 7,982,632 B2 | 7/2011 | Miller, Jr. | |
| 2005/0220403 A1* | 10/2005 | Dykaar | G02B 6/4214 385/31 |
| 2006/0159400 A1* | 7/2006 | Richards | E21B 17/028 385/53 |
| 2006/0260803 A1* | 11/2006 | Meijer | E21B 17/023 166/244.1 |
| 2008/0302527 A1* | 12/2008 | Coronado | E21B 23/04 166/242.1 |
| 2009/0038794 A1* | 2/2009 | Yamate | E21B 47/123 166/254.2 |
| 2011/0043818 A1 | 2/2011 | Sumetsky | |
| 2015/0050019 A1* | 2/2015 | Sengupta | H04J 14/04 398/44 |

OTHER PUBLICATIONS

Raw and E. Tenold , "Achievements of Smart Well Operations: Completions Case Studies for Hydro", paper SPE 107117 presented at 2007 EuropeoEAGE Annual Conference and Exhibition, London, Jun. 11-14, 2007 (15 pages).
International Preliminary Report on Patentability issued in the PCT Application PCT /US2015/063445, dated Jun. 6, 2017 (8 pages).

* cited by examiner

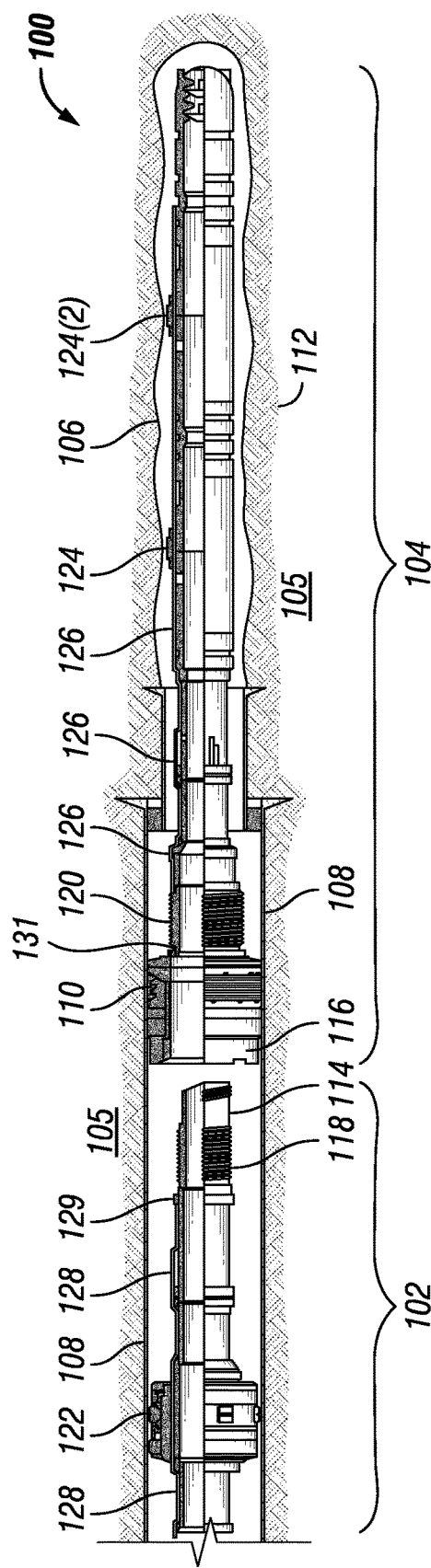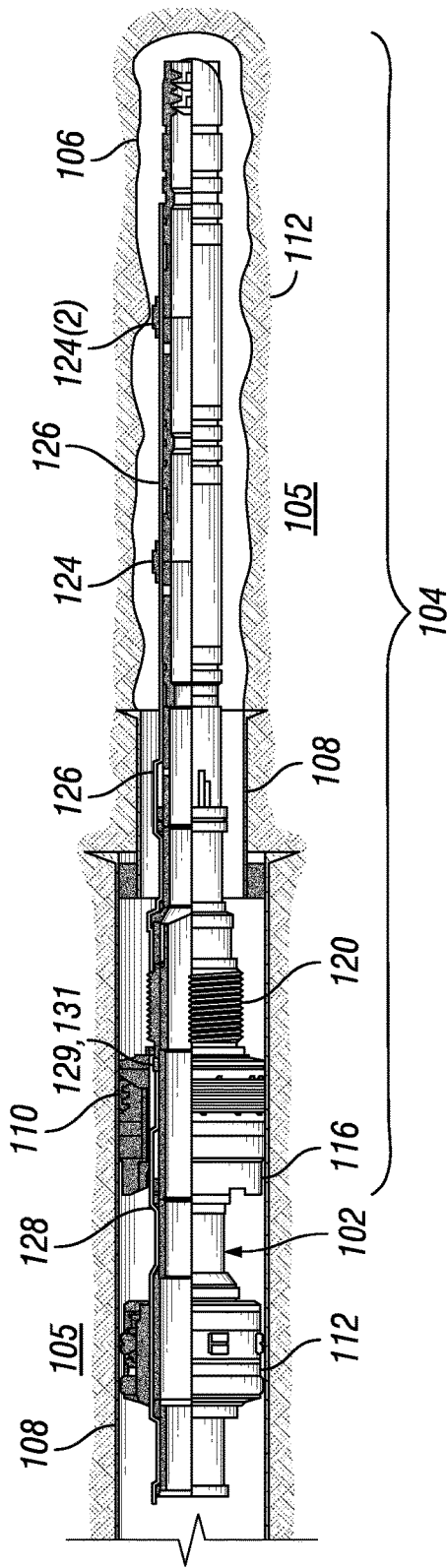
FIG. 1A
FIG. 1B

OPTICAL FIBER CONNECTION

PRIORITY

The present application claims the benefit of U.S. Application Ser. No. 62/086,539 filed Dec. 2, 2014, which application is incorporated herein, in its entirety, by reference.

BACKGROUND

Fiber optic sensors are currently used in a wide variety of industries, including those where remote sensing of temperature, strain, pressure and other quantities is desired. Since fiber optic sensors can employ optical fibers as a sensing element, they can be immune from electrical interference, small in size, and can operate in high heat environments.

This combination of performance characteristics allows fiber optic sensors to be used in environments where other sensors are impractical and/or suffer from performance issues. For example, fiber optic sensors can be used in a variety of oilfield services applications, including in downhole environments too hot for semiconductor sensing technologies.

SUMMARY

Illustrative embodiments of the present disclosure are directed to optical fiber connections and their applications in downhole assemblies. In various embodiments, the downhole assembly includes a well completion element with an end that couples with a corresponding well completion element. An optical fiber extends along at least a portion of the well completion element and transmits an optical signal using a first mode. The well completion element includes an optical fiber connector that is coupled to the optical fiber. The connector also includes a mode converter that receives the optical signal from the optical fiber and converts the optical signal from the first mode to a second larger mode. This second larger mode may be used to more robustly communicate the optical signal to a corresponding optical fiber connector affixed to the corresponding well completion element.

In some embodiments, the mode converter transmits the optical signal to a second optical fiber that transmits the optical signal using the second larger mode. In further illustrative embodiments, the core of the second optical fiber is larger than the core the optical fiber. The larger core may be used to more robustly communicate the optical signal to a corresponding optical fiber connector affixed to the corresponding well completion element.

Various embodiments of the present disclosure are also directed to an optical fiber connector. The optical fiber connector includes an optical fiber that transmits an optical signal using a first mode. The optical fiber connector further includes a mode converter that receives the optical signal from the optical fiber and converts the optical signal from a first mode to a second larger mode. This second larger mode may be used to more robustly communicate the optical signal to a corresponding optical fiber connector. The mode converter and at least a portion of the optical fiber are a single solid component.

In some embodiments, the optical fiber connector also includes a second optical fiber that transmits the optical signal using the second larger mode. The mode converter transmits the optical signal to the second optical fiber. In further illustrative embodiments, the core of the second optical fiber is larger than the core the optical fiber. The larger core may be used to more robustly communicate the optical signal to a corresponding optical fiber connector.

This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1A shows an example downhole assembly with an upper element and a lower element in an uncoupled state in accordance with one embodiment of the present disclosure;

FIG. 1B shows the example downhole assembly of FIG. 1B in a coupled state;

DETAILED DESCRIPTION

Figure 2:
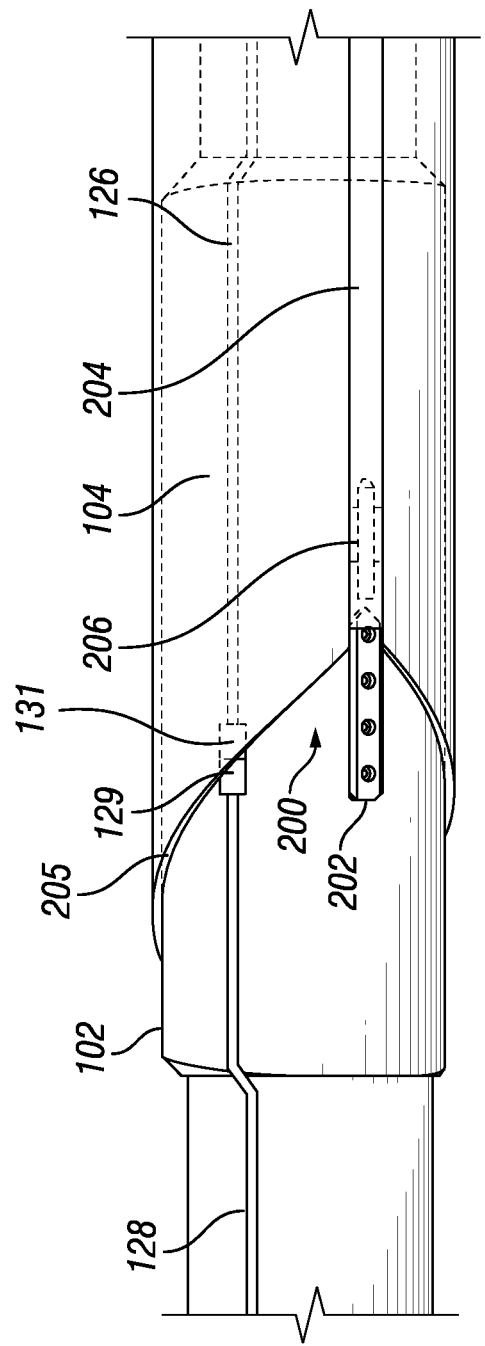
FIG. 2 shows an example latch coupling an upper element and a lower element of a downhole assembly in accordance with one embodiment of the present disclosure.

Illustrative embodiments of the present disclosure are directed to techniques and technologies that facilitate connection between optical fibers. For example, in one possible implementation, a connection between two optical fibers can be facilitated by converting an optical signal within an optical fiber from a first mode to a second larger mode through use of one or more mode converters.

As used herein, the term "optical fiber" includes any fiber capable of conveying an optical signal, including single mode fibers, multimode fibers, ribbon fibers, fibers that include fiber bragg gratings, multi-core fibers, photonic-crystal fibers (PCF), Siamese fibers, etc.

Optical signals can include any optical information in analog or digital form (including data, measurements, etc.), power to be transmitted optically, etc. In one possible implementation, optical signals can include any wavelengths and frequencies known in the art and can convey any spectral information known in the art, including for example Rayleigh information, Raman information, Coherent information, etc. Moreover, any techniques known in the art can be used to transmit, receive, and/or process the optical signals, including for example any photon counting techniques known in the art.

In one possible implementation, the optical fiber connection can be used to create and employ optical fiber sensing technologies to replace and/or augment electrical sensors and collect information regarding various aspects of a well (including a completed well), such as for example, temperature, pressure, strain, vibration, chemical composition, gas composition, etc. Additionally, fiber optic technology (e.g., optical fibers and the connections described herein) can be used to replace electrical cables.

Example Equipment

FIG. 1A shows an example downhole assembly 100 that uses optical fibers and optical fiber connectors. Downhole assembly 100 can include any downhole equipment used in the art, including, for example, equipment associated with operations such as completions, artificial lift, slick line, wireline, etc. Moreover, downhole assembly 100 can be employed in any environment found in oilfield services, such as, for example, dry or wet environments including hydrocarbons, water, gas, etc.

For the sake of illustration, and not limitation, downhole assembly 100 in FIG. 1A is shown as completions equipment having an upper element 102 (such as an upper completions element) and a lower element 104 (such as a lower completions element) in a well 106. Lower element 104 can contact a casing 108 of well 106 that traverses a formation 105 (such as, for example through one or more packers 110), while also extending into an unfinished, open hole section 112 of the well 106.

In one possible implementation, lower element 104 can be placed in well 106 before upper element 102. For example, in the case of completions equipment, lower element 104 can be placed in well 106 and left in place for up to several years while other wells proximate to well 106 (such as, for example, injector wells) are drilled. After these other wells are in place, upper element 102 can be placed downhole in well 106 to interact with lower element 104 in any way known in the art.

In one possible implementation, such interaction can include physical coupling of upper element 102 to lower element 104. For example, in one possible aspect, a terminal end 114 of upper element 102 can be placed inside a receiving end 116 of lower element 104. In the case of downhole assembly 100, this can place a male inductive coupler 118 on upper element 102 proximate a female inductive coupler 120 on lower element 104, functionally coupling male inductive coupler 118 and female inductive coupler 120. One or more packers 122 can also be included on upper element 102 to help facilitate various activities, such as production, in the well 106.

In one possible implementation, various sensors 124, including optical fiber sensors, can be placed on or proximate to lower element 104. Communication from sensors 124 can occur via an optical fiber 126 that extends along a length of lower element 104. The optical fiber 126 can be functionally coupled with an optical fiber 128 that extends along a length of upper element 102. Functional coupling, as will be described in greater detail below, can be accomplished using fiber optic connectors (including contact and contactless connections of optical fibers 126, 128). Moreover, more than one set of optical fibers 126, 128 can be found on downhole assembly 100. Optical fibers 126, 128 can be constructed of any materials known in the art, including, for example, glass, fluoride, etc.

In one possible embodiment, optical fibers 126, 128 can support guided modes. Moreover, depending on the diameter and geometry of the optical fibers 126, 128, the optical fibers 126, 128 may be able to transport single and/or multiple modes. Some or all of the modes can be preserved when optical fibers 126, 128 are coupled.

In one possible embodiment, the various sensors 124 can receive a wide variety of information regarding downhole assembly 100, well 106, and the formation that surrounds the well. In one possible aspect, sensors 124 can take measurements when activities take place, such as production of fluids from the formation into well 106.

In one possible embodiment, sensors 124 can be employed as any optical, electrical and/or magnetic distributed sensing technologies known in the art. For example, sensors 124 can provide distributed measurements and sensors 124 can be associated with point sensing, array sensing and/or quasi array sensing.

Sensors 124 can include, for example, distributed strain sensors, distributed acoustic/vibration sensors for acoustic/vibration monitoring, distributed chemical sensors, point sensors for pressure, temperature, strain, vibration, etc. In one possible aspect, measurements from sensors 124 can be used to understand various parameters including, for example, reservoir connectivity, drainage, and flow assurance. Such information can potentially give an operator the ability to extend the life of well 106 and avoid potentially expensive interventions through better understanding of various parameters such as, for example, production logging, flow rate, flow allocation, integrity monitoring, gas lift, vertical seismic profiling, leak detection, fluid level indication, structural and mechanical details associated with both reservoir and well completion components, fluid phase information in single/two/three phases, plug and abandonment information, compaction monitoring, sand detection, proppant and fracture monitoring, micro seismic information, etc.

In addition to conveying optical signals comprising measurements and data between upper element 102 and lower element 104, in one possible embodiment, optical fibers 126, 128 can allow for transmission of power between upper element 102 and lower element 104 through the conveyance of optical signals.

FIG. 1B illustrates an example coupling of upper element 102 and lower element 104. As illustrated, terminal end 114 of upper element 102 is inside receiving end 116 of lower element 104. In one possible implementation, when upper element 102 is coupled to lower element 104, optical fiber 126 is functionally coupled to optical fiber 128 using optical fiber connectors 129 and 131. Optical fiber connector 129 is rigidly attached to the upper completion 102 and is also coupled to optical fiber 128. Optical fiber connector 131 is rigidly attached to the lower completion 104 and is also coupled to optical fiber 126. FIG. 1A shows the optical fiber connectors 129 and 131 when they are disconnected and FIG. 1B shows the connectors when they are connected. In one possible embodiment, optical fiber 128 can be functionally coupled to optical fiber 126 inside of an element on lower element 104, such as a packer 110. Alternately, or additionally, optical fiber 128 can be functionally coupled to optical fiber 126 inside a protective tube, such as inside a hydraulic line. Protective tubes can include any tubes or lines known in the art, including for example, sheaths, armored lines, sprayed on coatings, quarter inch diameter lines, one eight inch diameter lines, etc. Moreover, the protective tubes can be formed from any materials known in the art, including, for example, stainless steel, sapphire, etc.

When a protective tube is used, in one possible aspect, once optical fiber 126 and optical fiber 128 are functionally coupled using optical fiber connectors 129 and 131, cleaning fluid can be pumped through the protective tube to clean faces and/or lenses at a point of interaction where optical signals are passed between optical fibers 126, 128 (such as, for example, at the ends of optical fiber 126 and optical fiber 128). In one possible implementation, the cleaning fluid can, for example, wash away contaminants such as oil, dirt, etc., on faces and/or lenses of optical fiber 126 and optical fiber 128. Cleaning in this fashion can decrease or eliminate optic scattering and other potential losses. In some such instances, some of the refraction matched cleaning fluid can remain in place during conveyance of information between optical fiber 126 and optical fiber 128. In one possible aspect, the cleaning fluid can comprise a refraction matched fluid optically compatible with optical fiber 126, optical fiber 128 and/or any lenses that might be positioned there between.

In one possible implementation, optical fiber 126 and optical fiber 128, and the protective tube surrounding them, can be shop assembled. For instance, the protective tube can be filled with oil and pressure balanced with a hermetic, glass-sealing of optic fibers 126, 128. In one possible embodiment, optic fibers 126, 128 can be single channel, with a mechanical housing system to handle debris management.

Figure 7A:
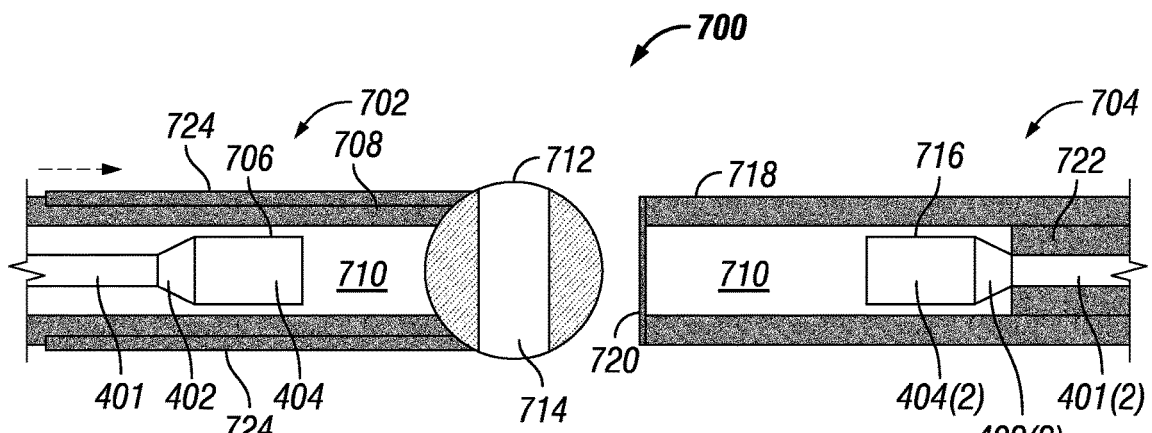
FIG. 7A shows male and female optical fiber connectors in a disconnected state in accordance with one embodiment of the present disclosure.
Figure 7B:
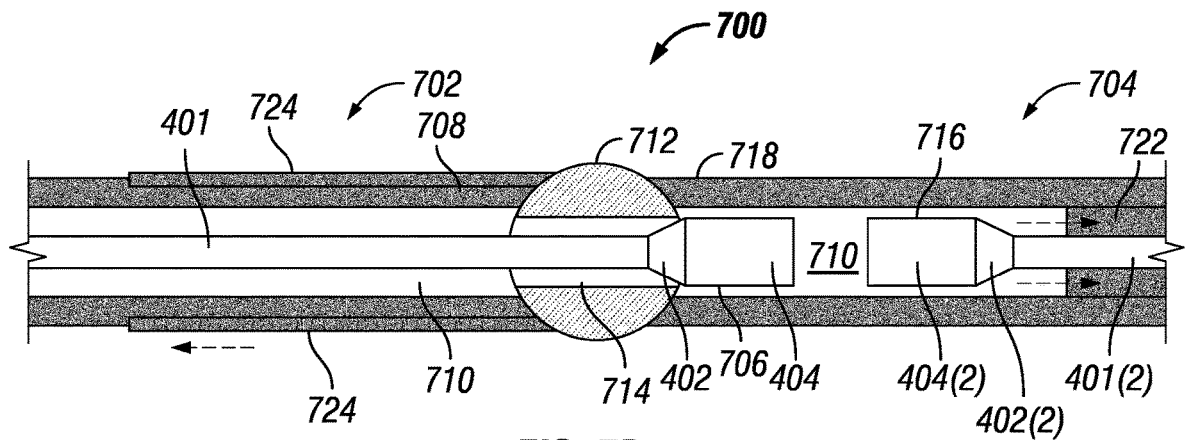
FIG. 7B shows the male and female optical fiber connectors of FIG. 7A in a connected state.

Further details regarding optical fiber connectors 129 and 131 are shown in FIGS. 7A and 7B and described in the accompanying description.

FIG. 2 illustrates an example latch 200 coupling upper element 102 and lower element 104. As illustrated, latch 200 secures upper element 102 to lower element 104 via an alignment key 202 on upper element 102 which fits in an associated keyway 204 on lower element 104. The contoured edge 205 of the lower completion 104 guides the alignment key 202 into the keyway 204 when the upper element 102 and lower element 104 are rotationally misaligned. In one possible implementation, the tolerance between the alignment key 202 and the keyway 204 can determine how much upper element 102 and lower element 104 are able to rotate relative to one another. Moreover, in another possible implementation, the length of alignment key 202 and keyway 204 can be used to lessen or eliminate angular misalignment between upper element 102 and lower element 104 (i.e. function as an alignment latch). Stated another way for the sake of clarity, a longer alignment key 202 in a longer keyway 204 can increase the likelihood that upper element 102 and lower element 104 lie along a common axis.

In one possible embodiment, a length of terminal end 114 seated within receiving end 116 of lower element 104 can perform a similar functionality as an alignment latch. For example, the longer the length of the terminal end 114 seated within receiving end 116, the greater the likelihood that angular misalignment between the upper element 102 and the lower element 104 will be avoided.

Latch 200 can also include additional functionality 206, such as locking latch functionality configured to resist rotation of upper element 102 and lower element 104 relative to one another and/or sliding of upper element 102 relative to lower element 104 along keyway 204 such that upper element 102 and lower element 104 will not accidentally decouple once they have been coupled.

In addition to the alignment key 202 and keyway 204 configuration forming an alignment latch illustrated in FIG. 2, latch 200 can be configured in any other manner known in the art, and can use any variety of functionalities to secure upper element 102 to lower element 104 and improve alignment of upper element 102 and lower element 104. Thus, latch 200 can include anti-rotation functionality, anti-angular misalignment functionality, anti-sliding functionality etc. Additionally, in one possible implementation, more than one latch 200 may be employed on downhole assembly 100.

FIG. 2 shows optical fibers 126 and 128 and optical fiber connectors 129 and 131. The optical fiber 126 and corresponding optical fiber connector 131 are rigidly attached to lower element 104, while optical fiber 128 and corresponding optical fiber connector 129 are rigidly attached to the upper element 102. The use of latch 200 to couple upper element 102 and lower element 104 can ensure that optical fiber connector 131 (optical fiber 126) and optical fiber connector 129 (optical fiber 128) connect properly and that the elements remain in fixed alignment during operation of the completions. This alignment enables the face of optical fiber connector 131 to communicate with a face of optical fiber connector 129 so that optical signals can be successfully communicated between the optical fibers 126, 128.

In addition to uses associated with downhole elements in a well environment, such as those described in FIGS. 1A, 1B, and 2, it will also be understood that the principles of optical fiber connection can be used in any other environments (and with any equipment) found in oilfield services, including, for example, surface environments, seabed environments, etc.

For instance, the principles of optical fiber connection as described herein can be used to couple optical fibers (such as optical fibers 126, 128) anywhere as desired in a subsea system, including, for example, in vertical and/or horizontal subsea trees, surface junction boxes, any points where an optical fiber has a splice break surface, etc.

In another possible implementation, the optical fiber connection as described herein can be used to couple optical fibers at and/or in a wellhead outlet, in a hybrid cable (with, for example, electrical and optical fibers).

Examples of Mode Conversion

Several difficulties can arise when attempting to align optical fiber 126 to communicate with optical fiber 128. For example, when one or more of optical fibers 126, 128 include a fragile end face, contact between optical fibers 126, 128 can scratch or otherwise degrade the fragile face(s), resulting in a reduced efficiency of transmission of optical signals between optical fibers 126, 128.

One possible solution for such a difficulty can include the utilization of a contactless coupling of optical fibers 126, 128 (examples of which will be described in more detail below). Another possible solution can include the employment of robust end pieces on optical fibers 126, 128 made from crush and/or scratch resistant materials such as, for example, sapphire or diamond.

Another difficulty associated with attempting to align optical fibers 126, 128 can arise when small diameter optical fiber cores are used, such as single mode optical fibers. Such fibers may have optical signal transmitting cores with diameters in the range of a few micrometers. A typical optical fiber has a core diameter of 8 microns. A typical diameter (with cladding) for an optical fiber is 250 microns. On a scale as small as this, misalignment of end faces of optical fiber cores by as little as a few tens of nano-meters can reduce or destroy coupling efficiency of optical fibers 126, 128.

This issue can be addressed by converting the mode of the optical signal within a first optical fiber core to a larger second mode. For example, in one embodiment, the mode size is increased by increasing the core diameter of the small diameter optical fiber core to a larger core diameter (such as that of a large area core optical fiber) using one or more mode converters. In one possible implementation, the mode converter can increase the diameter of the small optical fiber core as large as is desired to facilitate alignment and/or communication between optical fibers 126, 128. For example, in one possible implementation the mode converter can increase the diameter of the small diameter optical fiber core to a diameter between one eighth of an inch (0.3175 cm) to one quarter of an inch (0.635 cm). In another possible implementation, the mode converter can increase the diameter of the small diameter optical fiber core to a diameter equal to or greater than one quarter inch (0.635 cm). In yet another possible implementation, the mode converter can increase the diameter of the small diameter optical fiber core to a diameter less than one eighth of an inch (0.3175 cm).

The "mode" of the optical signal is the form that an optical signal will take as the signal propagates through a medium. The form of the optical signal can be determined using the Helmholtz equation. The mode of an optical signal can be enlarged by increasing the size of the form. For example, the LPO1 mode of an optical signal within an optical fiber core produced a circular form. The LPO1 mode can be enlarged by increasing the diameter of the circular form. In this manner, the form of the mode remains constant, but the size of the mode is enlarged.

Figure 3:
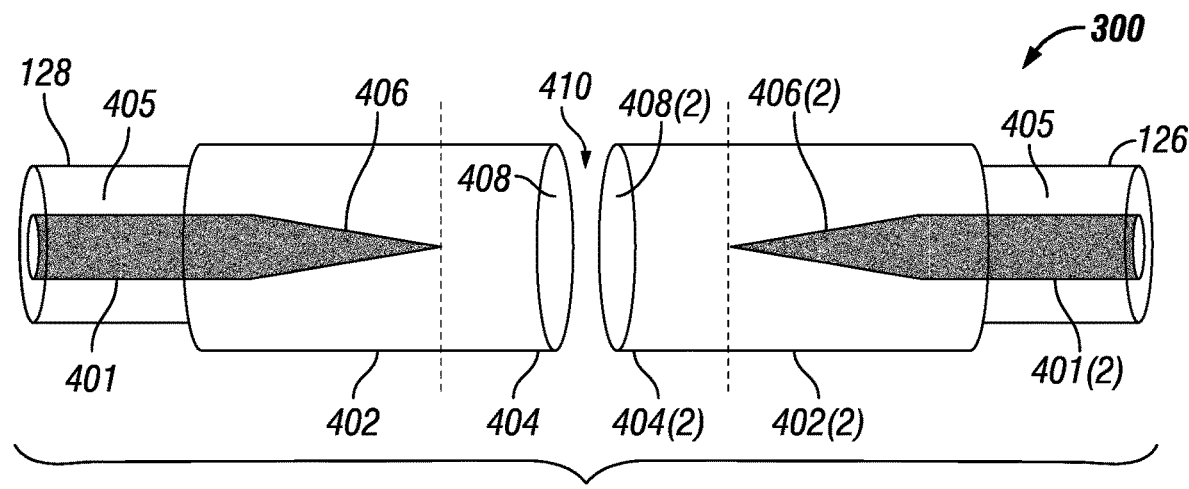
FIG. 3 shows an example mode converter design in accordance with one embodiment of the present disclosure.

FIG. 3 illustrates an example mode converter design 300 configured to connect optical fibers 126, 128. As shown, a mode converter 402 increases a diameter of single mode optical fiber core 401 to a diameter of a larger diameter optical fiber core 404. Mode converter 402 does this by gradually tapering down the diameter of single mode optical fiber core 401 along a taper 406 inside a length of the mode converter 402. By tapering, and through use of mode converter 402, the diameter of optical fiber core 401 is gradually converted to match that of large diameter optical fiber core 404.

In various embodiments, a second mode converter 402(2) can increase a diameter of single mode optical fiber core 401(2) to a diameter of a second larger diameter optical fiber core 404(2) configured to interface with large diameter optical fiber 404. The second mode converter 402(2) does this by gradually tapering down the diameter of single mode optical fiber core 401(2) along a second taper 406(2) inside a length of the second mode converter 402(2), which overlaps with large diameter optical fiber core 404(2).

Cladding 405 for the optical fibers 126, 128 is shown in FIG. 3, but is omitted from FIGS. 4-9 for the sake of simplicity. Cladding 405 may also be provided on the large diameter optical fiber cores 404, 404(2) and/or the mode converters 402, 402(2).

Figure 4:
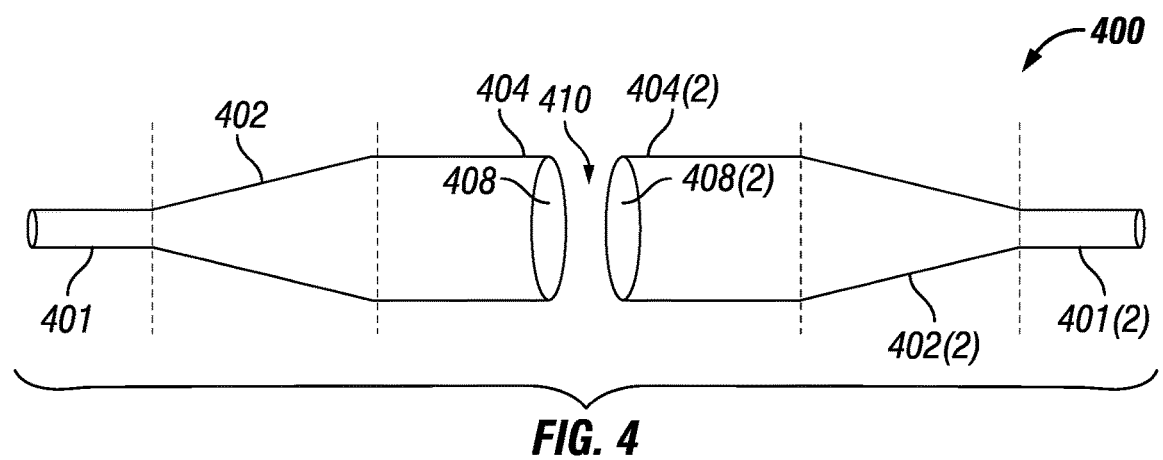
FIG. 4 shows another mode converter design in accordance with one embodiment of the present disclosure.

FIG. 4 shows another mode converter design 400. As illustrated in this example configuration, mode converter 402 can be used to increase a diameter of single mode optical fiber core 401 to match a diameter of large diameter optical fiber core 404. In one possible embodiment, a second mode converter 402(2) can be employed to similarly increase a diameter of single mode optical fiber core 401(2) to match a diameter of large diameter optical fiber core 404(2). Mode converters 402, 402(2) can increase the diameters of optical fiber cores 401, 401(2) as gradually or as rapidly as desired to match the diameters of large diameter optical fiber cores 404(2), 404.

The diameters of large optical fiber cores 404, 404(2) in FIGS. 3 and 4 can be chosen on a variety of bases, including ease of alignment, reliability of optical signal transmission and/or reception, etc. In one possible aspect, diameters of large optical fiber cores 404, 404(2) can be approximately equal.

In various embodiments, an anti-reflection coating can be added to the faces 408, 408(2) of the large diameter optical fiber cores 404, 404(2) of FIGS. 3 and 4. In one possible aspect, this anti-reflection coating can reduce reflection of optical signals from faces 408, 408(2) at a point of interaction 410. Any anti-reflection coating known in the art can be used, such as silicon dioxide and titanium dioxide.

Moreover, both contact and contactless connections can be completed between the large diameter optical fiber cores 404, 404(2) of FIGS. 3 and 4. When the connection is contactless, fluid can be placed between large diameter fiber core 404 and large diameter optical fiber core 404(2). The fluid can be chosen to match a refraction index of the large diameter optical fiber cores 404, 404(2).

Figure 5:
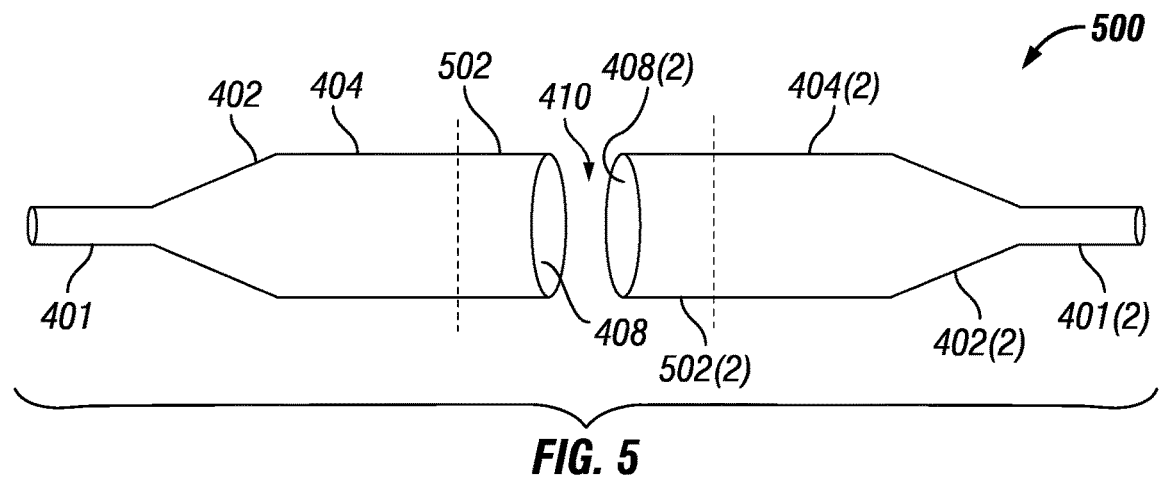
FIG. 5 shows another mode converter design in accordance with one embodiment of the present disclosure.

FIG. 5 shows another example mode converter design 500 configured to transfer an optical mode from a small diameter single mode optical fiber core to large diameter optical fiber core. In one possible implementation, this design can be contactless, utilizing a graded index lens 502. Mode converter 402 can be used to transfer the optical mode from small diameter single mode optical fiber core 401 to large diameter optical fiber core 404. Using mode converter 402, the diameter of single mode optical fiber core 401 can be increased as gradually or as steeply as desired to match the diameter of large diameter optical fiber core 404. A graded index lens 502 can be incorporated at the end of large diameter fiber core 404 to collimate the optical field at the output of large diameter optical fiber core.

In various embodiments, a design of a receiving fiber core can be symmetric. A second mode converter 402(2) can increase a diameter of optical fiber core 401(2) to a diameter of a second large diameter optical fiber core 404(2). A second graded index lens 502(2) can then be incorporated at the end of the second large diameter fiber core to collimate the optical field at the output of the second large diameter optical fiber.

In one possible implementation, when graded index lenses (such as graded index lens 502, 502(2)) are used to collimate output fields, a gap can exist between face 408, face 408(2). In one possible aspect, this gap can be at least partially filled with fluid, such as, for example, a refraction matched fluid. To reduce reflection of optical signals from faces 408 and 408(2), an anti-reflection coating can be added to one or both faces. In a further embodiment, the mode converters 402, 402(2), the large diameter optical fiber cores 404, 404(2), and/or the graded index lenses 502, 502(2) can be made from the same material as the small single mode fiber cores 401, 401(2).

Figure 6:
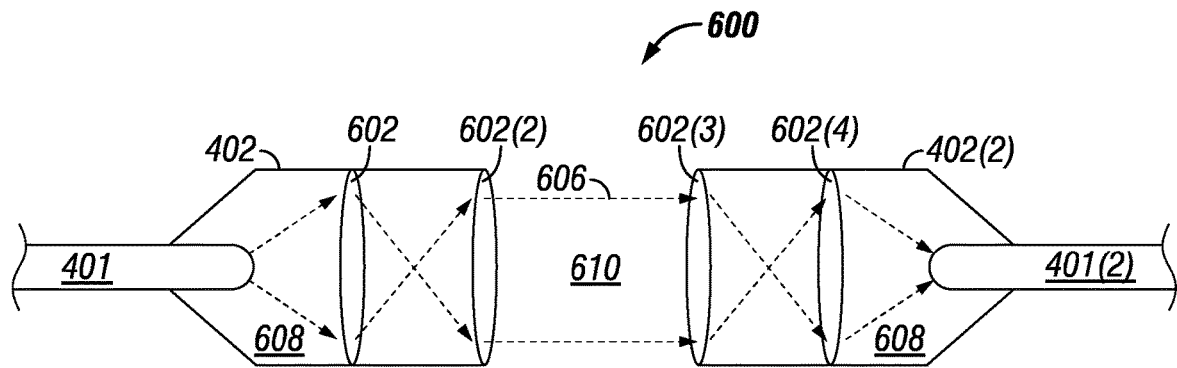
FIG. 6 shows another mode converter design incorporating lenses in accordance with one embodiment of the present disclosure.

FIG. 6 illustrates yet another example connection design 600 for connecting optical fibers 126, 128. This design 600 uses lenses to form a mode converter. As shown in FIG. 6, a mode converter 402 is formed using two lenses 602 and 602(2). The first lens 602 receive an expanding input beam from the small optical fiber core 401. The first lens 602 focuses this expanding input beam on a focal point between the first and second lenses. The second lens 602(2) receives the resulting beam and generates a collimated output beam 606 with a diameter that is larger than the diameter of the small optical fiber core 401. The collimated output beam 606 can be received by a second mode converter 402(2) with two lenses 602(3) and 602(4). The third lens 602(3) receives the collimated output beam 606 and focuses the beam on a focal point between the third and fourth lenses. The fourth lens 602(4) focuses the resulting beam onto a small optical fiber core 401(2).

By collimating output signal 606, alignment issues can be at least partially mitigated and also a gap 610 (with various different lengths) can be maintained and used between the lenses 602(2), 602(3), such that the lenses do not physically contact one another. In one possible implementation, gap 610 is filled with a fluid. This fluid can have a refraction index matching one or more of the lenses 602-602(4) and/or the optical fiber cores 401, 401(2).

In various embodiments, the lenses 602-602(4) are aspheric lenses formed from a sapphire or diamond material. A solid matrix material 608, such as glass, can be used to set the lenses and the optical fibers in place and to provide structural integrity to the mode converters 402 and 402(2).

The mode converters described herein can have a monolithic design or can be fabricated from a collection of parts and materials. In FIG. 4, the mode converters have a monolithic design (e.g. each mode converter is fabricated from a single material). In yet further embodiments, the mode converter, the small optical fiber cores, and/or the large optical fiber cores can be a single monolithic component. Alternatively, the mode converters can be made from a collection of several parts. For example, FIG. 6 shows mode converters that each include two lenses. In some embodiments, the mode converters are formed into a solid component. As used herein, the term "solid component" means a component that is formed entirely from solid materials. For example, the mode converters 402 and 402(2) in FIG. 6 are solid components because they include a solid matrix material that is used to set solid lenses in position and to provide structural integrity to the mode converters. In yet further embodiments, the mode converter, the small optical fiber cores, and/or the large optical fiber cores can be a single solid component. In other embodiments, the mode converters do not have a solid component design. For example, in some embodiments, a fluid is located between the lenses. The fluid can be used to pressure compensate the mode converter and/or can be chosen to match the refraction indexes of the lenses. Downhole conditions may expose the mode converters to high pressures, high temperatures, corrosive environments, and/or mechanical shocks. In various embodiments, monolithic designs or solid component designs will help the mode converters perform more robustly and reliably under downhole conditions.

FIGS. 7A and 7B show one example of an optical fiber connection 700. FIG. 7A shows a male fiber optical connector 702 and a female fiber optical connector 704 when the elements are disconnected, while FIG. 7B shows the elements when they are connected. The male fiber optical connector 702 includes a fiber assembly 706 (e.g., small diameter fiber core 401, a mode converter 402, and a large diameter fiber core 404). The fiber assembly 706 is contained in a housing 708 (e.g., protective tube) that is filled with a fluid 710. The fluid can be used to compensate for pressure outside of the housing and/or to match the refractive index of one or more components of the fiber assembly 706. Such refractive index matching fluids can be obtained from Cargille Laboratories of Cedar Grove, N.J. The male fiber optical connector 702 further includes an isolation valve 712 at an end of the housing 708. In this embodiment, the isolation valve is a ball valve that includes a slot 714. The slot 714 is sized so that the fiber assembly 706 can fit through the slot.

The female fiber optical connector 704 includes a second fiber assembly 716 (e.g., small diameter fiber core 401(2), a mode converter 402(2), and a large diameter fiber core 404(2)). The second fiber assembly 716 is contained in a second housing 718 (e.g., protective tube) that is filled with the fluid 710, which may also be used for pressure compensation and/or as a refractive index matching fluid. The female connector 704 includes a membrane 720 at the end of the second housing 718. The material and the thickness of the membrane 720 are selected so that the membrane maintains its integrity when the female connector is disconnected, but so that the membrane ruptures when the connection is made to the male connector 702. The membrane 720 can be made from metallic or polymeric materials. The female connector 704 further includes a fluid compensating piston 722 which adjusts to facilitate fluid 710 movement between the connectors 702 and 704 when a connection is made.

FIG. 7B shows the elements 702 and 704 in a connected state. In order to make the connection, the ball valve 714 engages the second housing 718 of the female connector 704 and ruptures the membrane 720. As the ball valve 712 engages the second housing 718, the ball valve is rotated by an axial lever 724. The slot 714 within the ball valve 714 is rotated to create fluid communication between the housing 708 and the second housing 718. The fiber assembly 706 is pushed through the slot 114 and optically engages the second fiber assembly, thereby creating an optical connection between the two optical fibers 128, 126. In various embodiments, the elements 702, 704 also create a seal between an inner volume within the housings (708 and 718) and an environment exterior to the housings when the elements are in the connected state. This seal (i) prevents fluid 710 from escaping the inner volume and (ii) prevents debris and other fluid from the exterior environment from entering the inner volume and affecting the transmission of optical signals between optical fiber assemblies 706, 716.

The optical fiber connectors 702, 704 shown in FIGS. 7A and 7B can be used as the optical fiber connectors 129, 131 shown in FIGS. 1A, 1B, and 2. The male connector 702 can be rigidly attached to the upper element 102 and the female connector 704 can be rigidly attached to the lower element 104 (or vice versa). Various modifications can be made to the optical fiber connectors and various other connection technologies can be used. For example, the ball valve 712 can be removed and the fiber assembly 706 can protrude beyond the housing 708 so that the fiber assembly engages the second housing 718 and ruptures the membrane 720.

Figure 8A:
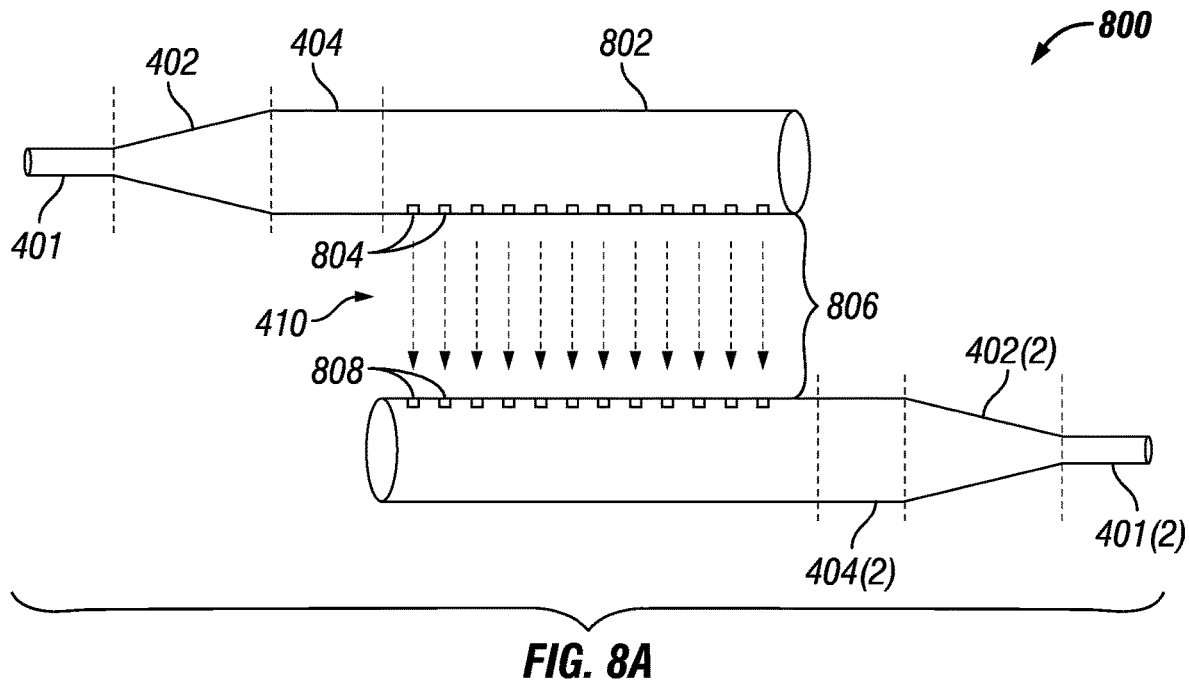
FIG. 8A shows a connector design that uses a beam forming grating in accordance with one embodiment of the present disclosure.

FIG. 8A shows a connector design that uses a beam forming grating. In this example configuration, a mode converter 402 can be used to transfer the optical mode from small diameter single mode optical fiber core 401 to large diameter optical fiber core 404. Large diameter optical fiber core 404 includes a beam forming fiber grating 802 which can take an optical signal from the optical fiber core 404 and create a collimated beam in the far field so that the optical signal is transmitted to a corresponding grating. The beam forming fiber grating 802 can perform periodic refractive index modulation at individual elements 804. In one possible implementation, individual elements 804 in beam forming fiber grating 802 can scatter the optical signal from optical fiber core 404 at a point of interaction 410 and form a coherent superposition in the far field.

In one possible embodiment, mode converter design 800 can be a side-coupled design with a gap 806 between large diameter optical fiber core 404 and large diameter optical fiber core 404(2). In one possible implementation, this contactless solution can have a tolerance to misalignment along and across the axis of large diameter optical fiber core 404 and large diameter optical fiber core 404(2). In one possible implementation, gap 806 can be large enough to allow beam reforming from each element 804 in receiving elements 808 on opposing large diameter optical fiber core 404(2). In one possible aspect, gap 806 can be filled at least partially with a fluid. In one possible aspect, this fluid can have a refraction index matching one or both of large diameter optical fiber core 404 and core 404(2).

Figure 8B:
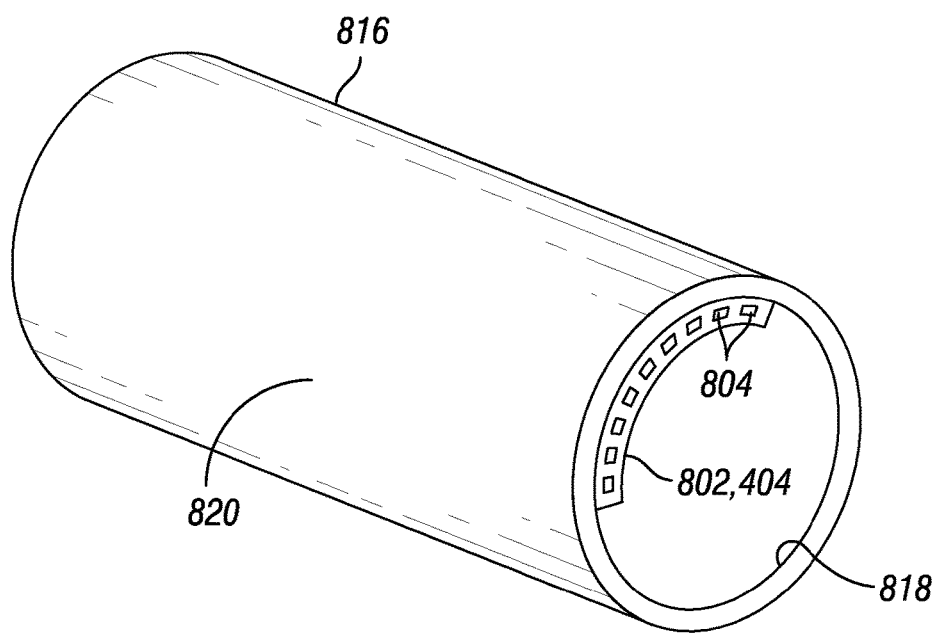
FIG. 8B shows a connector design that uses a curved beam forming grating in accordance with one embodiment of the present disclosure.

FIG. 8B shows a connector design that uses a beam forming grating with a curved shape. The beam forming grating 802 and the large fiber core 404 form a curved (e.g., ringed) shape and are affixed to an inner surface 818 of a tube (or mandrel) 816 on a plane that is perpendicular to the axis of the tube. In a similar manner, the beam forming grating 802 can also be affixed to the terminal end of a well completion element. When coupled to a corresponding well completion element with receiving elements 808 affixed in similar manner, the beam forming grating 802 can establish optical communication. In various embodiments, such configurations have greater tolerance for rotational misalignment between completion elements. Other configurations are also possible. For example, the beam forming grating 802 can be affixed to an outer surface 820 of the tube 816 and/or may be affixed in a direction perpendicular to the axis of the tube.

Figure 9:
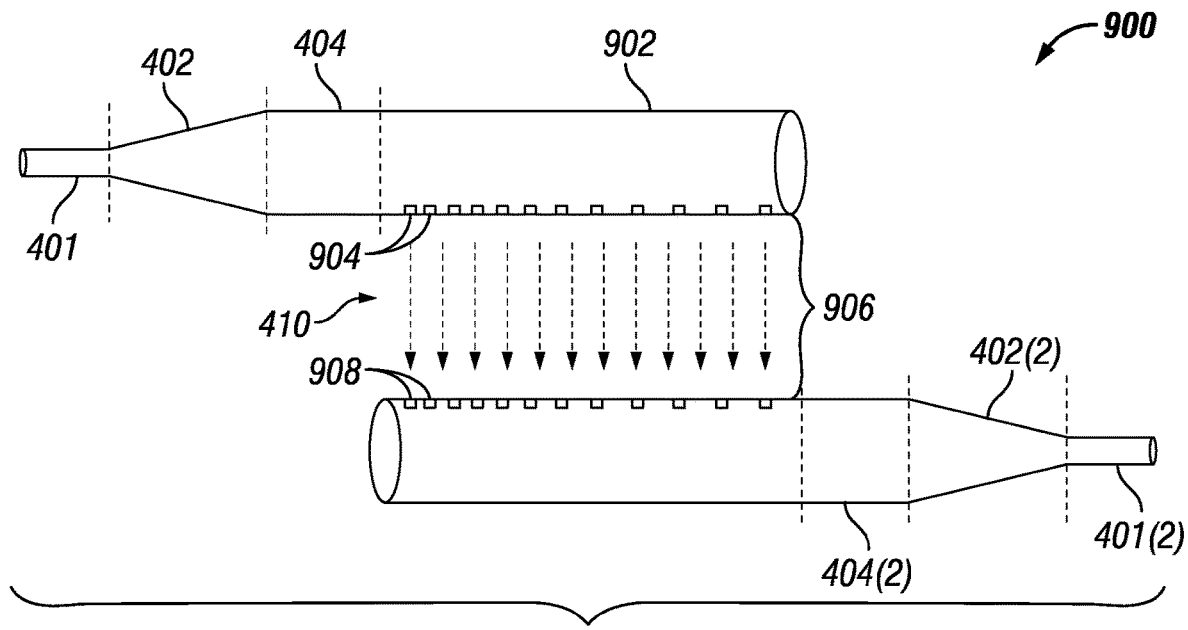
FIG. 9 shows a connector design that uses a resonant beam forming grating in accordance with one embodiment of the present disclosure.

FIG. 9 shows a connector design that uses a resonant beam forming grating. In this example configuration, mode converter 402 can be used to increase the diameter of single mode optical fiber core 401 to match a diameter of the large diameter fiber core 404. A resonant beam forming fiber grating 902 on large diameter fiber core 404 can create a collimated beam in the far field from an optical signal received from optical fiber core 401. In one possible implementation, beam forming grating 902 can effect periodic refractive index modulation on an optical signal received from optical fiber core 401 via individual elements 904. Individual elements 904 can scatter the optical signal received from optical fiber core 401, forming a coherent superposition in the far field. In one possible implementation, mode converter design 900 can be a side-coupled design with a gap 906 existing at point of interaction 410 between large diameter fiber core 404 and large diameter fiber core 404(2).

In one possible embodiment, the design 900 can be contactless, with a tolerance to misalignment along and across an axis of large diameter optical fiber core 404 and large diameter optical fiber core 404(2). In one possible aspect, the gap 906 can be large enough to allow beam reforming from each element 904 in corresponding elements 908 on opposing large diameter optical fiber core 404(2) to be optically connected to single mode optical fiber core 401(2). In one possible aspect, gap 906 can be filled at least partially with a fluid. In one possible aspect, this fluid can have a refraction index matching one or more of large diameter optical fiber cores 404 and 404(2).

It will be understood that the mode converters 402, 402(2) as described herein can be constructed from any materials known in the art, including plastic, glass, sapphire, etc. This includes constructing mode converters 402, 402(2) out of the same materials as the optical fiber cores 401, 401(2)

Also, in one possible implementation, mode converters 402, 402(2) may include their respective large diameter optical fiber core 404, 404(2) and/or the respective large diameter optical fiber cores can be a part of the mode converters. Furthermore, the mode converters 402, 402(2) and their respective large diameter optical fiber core 404, 404(2) can form a single solid component and/or a single monolithic component.

Additionally, it will be understood that communications of optical signals associated with the various embodiments described herein may be facilitated in either direction between optical fiber 126 and optical fiber 128.

Example Methods

Figure 10:
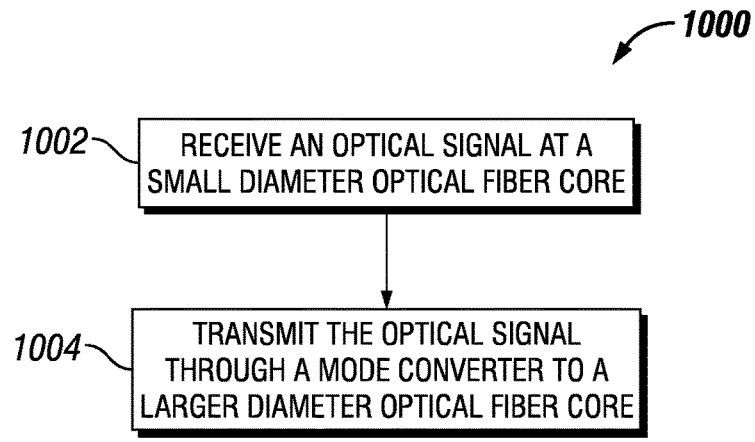
FIG. 10 shows an example method in accordance with one embodiment of the present disclosure.

FIG. 10 illustrates an example method for implementing aspects of optical fiber connection. The methods are illustrated as a collection of blocks and other elements in a logical flow graph representing a sequence of operations. For purposes of illustration, and not purposes of limitation, selected aspects of the methods may be described with reference to elements shown in FIGS. 1-9.

FIG. 10 illustrates an example method 1000 associated with embodiments of optical fiber connection. At block 1002 an optical signal is received at a small diameter optical fiber core. For example, an optical signal can be received at optical fiber 126 from a sensor 124. In one possible implementation, the diameter of the small diameter optic fiber core is small enough to complicate alignment and coupling of the small diameter optic fiber core with another similarly small diameter optic fiber core.

At block 1004, the optical signal is transmitted through a mode converter to a larger diameter optical fiber core. For example the optical signal is transmitted though mode converter 402(2) to large diameter optic fiber core 404(2). The mode converter can increase the diameter of the small optical fiber core to the diameter of the larger diameter optical fiber core as gradually or rapidly as desired. Moreover the diameter of the large diameter optical fiber core can be chosen on a variety of bases, including ease of alignment of the large diameter optical fiber core with another large diameter optical fiber core (such as large diameter optical fiber core 404), reliability of optical signal transmission from the large diameter optical fiber core and/or reception at the large diameter optical fiber core, etc.

Example Computing Systems

Figure 11:
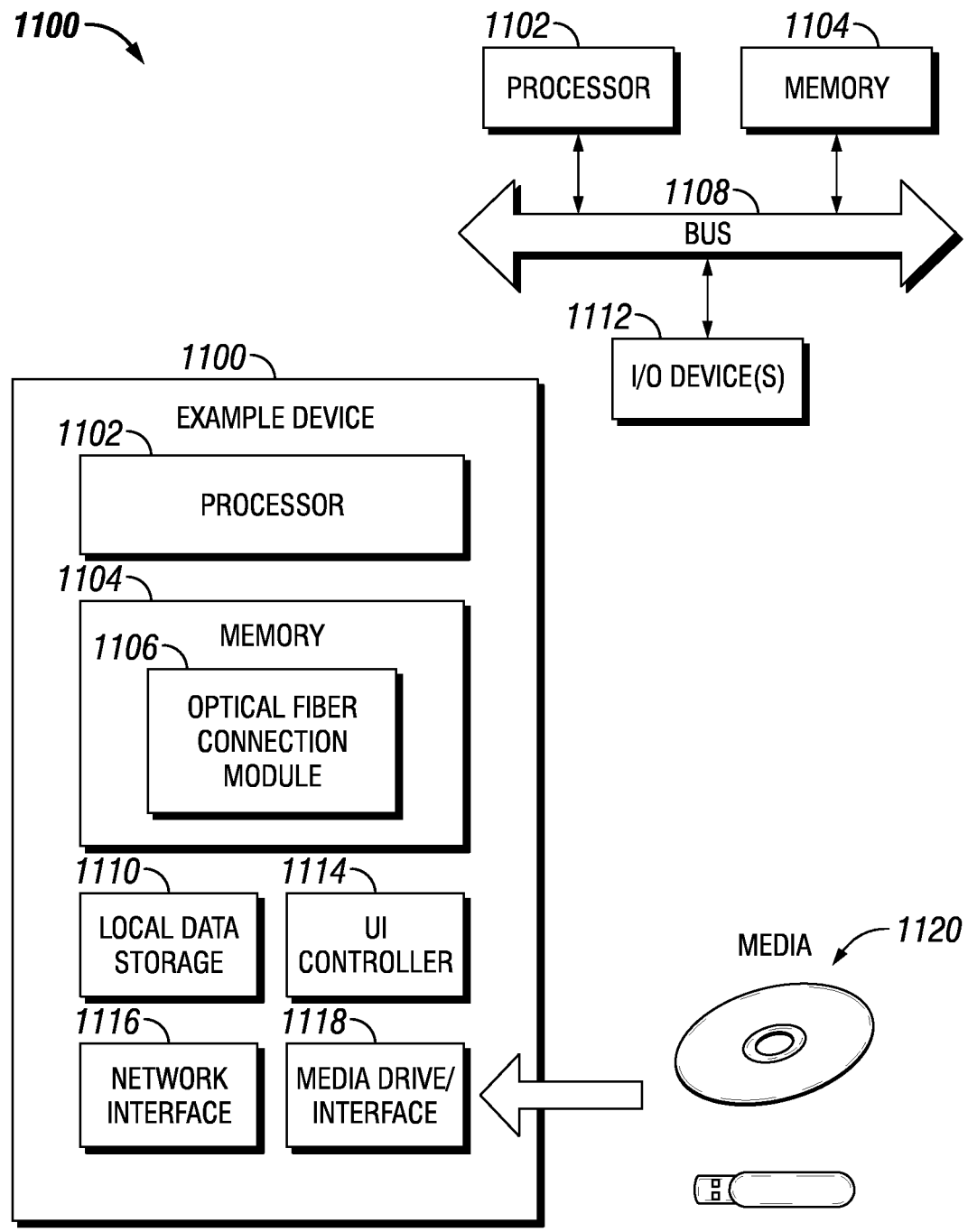
FIG. 11 shows an example computing environment that can be used in accordance with embodiments of the present disclosure.

FIG. 11 illustrates an example system 1100, such as one or more computing devices, programmable logic controllers (PLCs), etc., with a processor 1102 and memory 1104 for hosting an optical fiber connection module 1106 for implementing various embodiments of fiber optic connection as discussed in this disclosure (including, for example, issuing commands to generate and/or send optical signals, receiving optical signals, analyzing optical signals to receive data and/or measurements associated therewith, etc.). System 1100 is one example of a computing device or programmable device, and is not intended to suggest any limitation as to scope of use or functionality of system 1100 and/or its possible architectures. Further, system 1100 should not be interpreted as having any dependency relating to one or a combination of components illustrated in the system 1100. For example, system 1100 may include a computer, such as a laptop computer, a desktop computer, a mainframe computer, a sensing device, etc., or any combination or accumulation thereof.

In one possible implementation, system 1100 includes one or more processors or processing units 1102, one or more memory components 1104 (on which, for example, fiber optic connection module 1106 may be stored in whole or in part), a bus 1108 configured to allow various components and devices to communicate with each other, and local data storage 1110, among other components.

Memory 1104 may include one or more forms of volatile data storage media such as random access memory (RAM)), and/or one or more forms of nonvolatile storage media (such as read-only memory (ROM), flash memory, and so forth).

Bus 1108 can include one or more of any of several types of bus structures, including a memory bus or memory controller, a peripheral bus, an accelerated graphics port, and a processor or local bus using any of a variety of bus architectures. Bus 1108 can also include wired and/or wireless buses.

Local data storage 1110 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 1112 may also communicate via a user interface (UI) controller 1114, which may connect with the I/O device(s) 1112 either directly or through bus 1108.

In one possible implementation, a network interface 1116 may communicate outside of system 1100 via a connected network, and in some implementations may communicate with hardware.

In one possible embodiment, users and devices may communicate with system 1100 via input/output devices 1112 via bus 1108. In one possible implementation, input/output devices 1112 can include various devices capable of sending and/or receiving optical signals and/or converting between optical signals and digital information suitable for use by system 1100.

A media drive/interface 1118 can accept removable tangible media 1120, such as flash drives, optical disks, removable hard drives, software products, etc. In one possible implementation, logic, computing instructions, and/or software program comprising elements of the fiber optic connection module 1106 may reside on removable media 1120 readable by media drive/interface 1118.

In one possible embodiment, one or more input/output devices 1112 can allow a user to enter commands and information to system 1100, and also allow information to be presented to the user and/or other components or devices. Examples of input devices 1120 include, in some implementations, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of fiber optic connection module 1106 may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media.

"Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some examples discussed herein involve technologies from the oilfield services industry. It will be understood however that the techniques of optical fiber connection described herein can be used in a wide range of industries outside of the oilfield services sector, including any industries where fiber optic technology is used continuously and/or intermittently to convey things such as data, measurements, power (such as optical power), etc. This includes industries that, for example, utilize connections between large-scale microphotonic sensing and imaging arrays, etc.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. Moreover, embodiments may be performed in the absence of any component not explicitly described herein.

The invention claimed is:

1. A downhole assembly comprising:
   a first well completion element comprising:
      a first end that is configured to couple with a second end of a second well completion element;
      an optical fiber sensor that extends along at least a portion of the first well completion element and is configured to transmit an optical signal using a first mode; and
      a mode converter configured to receive the optical signal from the optical fiber sensor and convert the optical signal from the first mode to a second larger mode,
   wherein the mode converter is monolithic; and
   a beam forming grating monolithically formed with a large diameter optical fiber core configured to receive the second larger mode optical signal from the mode converter.

2. The downhole assembly of claim 1, wherein the mode converter transmits the optical signal to a second optical fiber sensor that transmits the optical signal using the second larger mode.

3. The downhole assembly of claim 2, wherein the optical fiber sensor comprises a first core having a first diameter, the second optical fiber sensor comprises a second core having a second diameter, and the second diameter is larger than the first diameter.

4. The downhole assembly of claim 1, wherein the first well completion element further comprises:
   an optical fiber connector that is (i) affixed to the first end of the first well completion element, (ii) coupled to the optical fiber, and (iii) comprises the mode converter, wherein the optical fiber connector is configured to connect to a corresponding optical fiber connector affixed to the second well completion element.

5. The downhole assembly of claim 4, wherein the optical fiber connector comprises a housing that contains the mode converter, the optical fiber sensor, and a fluid.

6. The downhole assembly of claim 5, wherein the optical fiber connector further comprises a valve located at an end of the housing.

7. The downhole assembly of claim 5, wherein the optical fiber connector further comprises a membrane located at an end of the housing.

8. The downhole assembly of claim 5, wherein the first well completion element comprises a pump configured to deliver cleaning fluid inside the housing to the mode converter.

9. The downhole assembly of claim 4, wherein the optical fiber connector further comprises the beam forming grating, the beam forming grating configured to transmit the optical signal to the corresponding optical fiber connector.

10. The downhole assembly of claim 9, wherein the beam forming grating has a curved shape.

11. The downhole assembly of claim 1, wherein the first well completion element comprises a latch for securing the first well completion element to the second well completion element.

12. The downhole assembly of claim 1, wherein the first well completion element comprises at least one of:
    an alignment key for guiding a coupling operation between the first well completion element and the second well completion element; and
    a keyway for guiding a coupling operation between the first well completion element and the second well completion element.

13. The downhole assembly of claim 1, wherein the optical fiber sensor comprises a single mode optical fiber.

14. The downhole assembly of claim 1, wherein the mode converter comprises two or more lenses that are not in physical contact with each another.

15. The downhole assembly of claim 1, wherein the mode converter comprises an anti-reflective coating.

16. A downhole assembly comprising:
    an upper well completion element comprising:
        a first end that is configured to couple with a second end of a lower well completion element;
        a first optical fiber sensor that extends along at least a portion the upper well completion element and is configured to transmit an optical signal using a first mode; and
        a first optical fiber connector that is (i) affixed to the first end of the upper well completion element, (ii) coupled to the first optical fiber sensor, (iii) comprises a first mode converter configured to receive the optical signal from the first optical fiber sensor and convert the optical signal from the first mode to a second larger mode carried on a large diameter optical fiber core, and (iv) comprises a beam forming grating configured to create a collimated beam from the optical signal in the large diameter optical fiber core; and
    the lower well completion element comprising:
        the second end that is configured to couple with the first end of the upper well completion element;
        a second optical fiber sensor that extends along at least a portion the lower well completion element and is configured to transmit the optical signal using the first mode; and
        a second optical fiber connector that is (i) affixed to the second end of the lower well completion element, (ii) coupled to the second optical fiber sensor, and (iii) comprises a second mode converter configured to convert the optical signal from the second larger mode to the first mode and transmit the optical signal to the second optical fiber sensor;
    wherein the first optical fiber connector is configured to optically couple to the second optical fiber connector through fluid placed between the first optical fiber connector and the second optical fiber connector, the fluid having a refraction index selected to match a refraction index of the first optical fiber and/or the second optical fiber.

17. An optical fiber connector comprising:
    an optical fiber sensor configured to transmit an optical signal using a first mode; and
    a mode converter configured to receive the optical signal from the optical fiber sensor and convert the optical signal from a first mode to a second larger mode;
    wherein a large diameter optical fiber core is configured to receive the second larger mode optical signal from the mode converter, wherein the mode converter, at least a portion of the optical fiber sensor, and the large diameter optical fiber core are a single monolithic component, and wherein the large diameter optical fiber core comprises a beam forming fiber grating.

18. The optical fiber connector of the claim 17, wherein the mode converter is configured to transmit the optical signal to a second optical fiber sensor configured to transmit the optical signal using the second larger mode.

19. The optical fiber connector of claim 18, wherein the optical fiber sensor comprises a first core having a first diameter, the second optical fiber sensor comprises a second core having a second diameter, and the second diameter is larger than the first diameter.

20. The optical fiber connector of claim 19, wherein the mode converter, at least a portion of the optical fiber sensor, and at least a portion of the second optical fiber sensor are a single solid component.

21. The optical fiber connector of claim 17, wherein the mode converter is configured to transmit the optical signal through a fluid and to a corresponding optical fiber connector.

22. The optical fiber connector of claim 17, wherein the mode converter comprises at least one lens.

23. The optical fiber connector of claim 17, wherein the optical fiber connector is configured to make a contactless connection with a corresponding optical fiber connector.

* * * * *